United States Patent [19]
Bish et al.

[11] Patent Number: 5,235,585
[45] Date of Patent: Aug. 10, 1993

[54] REASSIGNING DEFECTIVE SECTORS ON A DISK

[75] Inventors: John E. Bish; Daniel W. Fok; Brian G. Goodman; Arturo A. Mojica, all of Tucson, Ariz.

[73] Assignee: International Business Machines, Armonk, N.Y.

[21] Appl. No.: 758,923

[22] Filed: Sep. 11, 1991

[51] Int. Cl.⁵ .............................................. G11B 7/00
[52] U.S. Cl. ...................................... 369/54; 369/58; 369/48; 369/124
[58] Field of Search .................... 369/54, 58, 47, 48, 369/49, 50, 32, 124; 360/72.1, 72.2

[56] References Cited

U.S. PATENT DOCUMENTS

| | | | |
|---|---|---|---|
| 4,774,700 | 9/1988 | Satoh et al. | 369/54 |
| 4,839,879 | 6/1989 | Sawada et al. | 369/54 |
| 4,841,498 | 6/1989 | Sugimura et al. | 369/32 |
| 4,984,230 | 1/1991 | Satoh et al. | 369/54 |
| 5,005,165 | 4/1991 | Yamanaka et al. | 369/58 |
| 5,025,432 | 6/1991 | Naito | 369/36 |
| 5,111,444 | 5/1992 | Fukushima et al. | 369/58 |
| 5,132,956 | 7/1992 | Ichikawa | 369/58 |

FOREIGN PATENT DOCUMENTS

| | | |
|---|---|---|
| 0357049 | 3/1990 | European Pat. Off. |
| 63-161569 | 7/1988 | Japan |
| 0235663 | 2/1990 | Japan |

OTHER PUBLICATIONS
ISO(IEC 10089:1991 CE, 130 mm Recruitable Optical Cartridge for Information Interchange.

Primary Examiner—Aristotelis Psitos
Assistant Examiner—Muhammad Edun
Attorney, Agent, or Firm—F. E. Anderson; D. A. Shifrin

[57] ABSTRACT

The present invention locates spare sectors for replacing secondary defects found during disk use. A sorted defective sector list is maintained for tracking the spare sectors that have been previously used for replacements of other secondary defects. When a secondary defect address is found, a secondary defect list is updated both on the disk and in the drive's memory. A spare sector, for replacing the secondary defect is located by first calculating a group number to determine which group the secondary defect is located in. Next, the boundaries for a plurality of spare sectors allocated for that group is determined. After searching the replacement sector list, the first available spare sector of the plurality of spare sectors is identified as the replacement sector. If all of the plurality of spare sectors have been previously assigned as replacement sectors, a spare sector is instead located from a plurality of spare sectors allocated to a neighboring group. After locating the spare sector, its physical address is returned and the spare sector is logged in the defective sector list and in the replacement list.

32 Claims, 6 Drawing Sheets

FIG. 1

| TRACK | SECTOR |
|---|---|
| 4 | 3 |
| 5 | 8 |
| 7 | 16 |
| 8 | 6 |
| 8 | 7 |
| 10 | 8 |
| 11 | 14 |
| 12 | 3 |
| 14 | 0 |
| 15 | 4 |
| 18 | 9 |
| 20 | 14 |
| 21 | 2 |
| 21 | 5 |
| 24 | 11 |
| 26 | 4 |
| 28 | 1 |
| 28 | 10 |
| 29 | 1 |
| 30 | 1 |
| 31 | 13 |

PRIMARY DEFECT LIST

FIG. 2

| TRACK | SENSOR |
|---|---|
| 6 | 11 |
| 6 | 12 |
| 11 | 0 |
| 11 | 1 |
| 15 | 6 |
| 15 | 7 |
| 19 | 9 |
| 19 | 10 |
| 23 | 14 |
| 28 | 2 |
| 32 | 8 |

REPLACEMENT SECTORS IN ORDER

FIG. 4

| DEFECTIVE TRACK | DEFECTIVE SECTOR | REPLACEMENT TRACK | REPLACEMENT SECTOR |
|---|---|---|---|
| 3 | 5 | 6 | 11 |
| 5 | 10 | 6 | 12 |
| 9 | 4 | 11 | 0 |
| 9 | 5 | 11 | 1 |
| 13 | 5 | 15 | 6 |
| 13 | 12 | 15 | 7 |
| 17 | 6 | 19 | 9 |
| 18 | 4 | 19 | 10 |
| 22 | 7 | 23 | 14 |
| 26 | 7 | 28 | 2 |
| 31 | 1 | 32 | 8 |

SECONDARY DEFECT LIST

FIG. 3

OPTICAL MEDIA MAPPING SHOWING DEFECTS

REASSIGNING DEFECTIVE SECTORS ON A DISK

FIELD OF THE INVENTION

This invention relates generally to the field of disk defect management and more particularly, to an apparatus and method for more quickly locating available spare sectors for replacing secondary defects.

BACKGROUND OF THE INVENTION

All computers are required to process, and hence store, large amounts of information. Fast processing of information requires that the central processing unit of these computers be able to transfer that information at a high rate of speed. The storage medium used to store information will typically be the limiting factor of the transfer rates. Additional delays are caused by the time required by a storage device when a storage medium is initially loaded.

The fastest storage medium in a computer is main memory which is usually in the form of semiconductor random access memory (RAM). While main memory is very fast it is also volatile. Main memory use is thus limited to short term storage of currently active information. The remaining information storage requirements are typically handled by peripheral storage devices.

Peripheral storage devices include magnetic tape storage devices, Direct Access Storage Devices (DASD), and optical storage devices. Each of these storage devices has a substantially greater storage density and lower cost than main memory. However, the time to access information from each of these storage devices is also much greater than the access time of information from main memory. For example, main memory is accessed electronically and no mechanical movement is required. Peripheral storage devices, on the other hand, require that a particular area of tape or disk first be positioned under a read/write head before information accessing can begin.

While increasing amounts of data continue to be stored on a single storage medium, a corresponding problem occurs regarding defects. The number of defects per million of bits stored increases as the density of bits per unit area increase, in part, because a smaller area is required per bit, and hence smaller and smaller particles are capable of causing errors. As a result, storage media capable of storing large amounts of data, also have an increased number of defects. Dealing effectively with the increased number of defects generally requires more complex, and hence more expensive solutions. Access time to the data is a major concern and since many defects are handled in real time, the solution chosen to deal with the defects must be fast.

One defect management solution for storage media is error correction and detection. Parity generation and checking has been used to provide a means of determining whether data has been sent and received correctly (written and read back). In parity generation, when a string of bits is to be written, an extra bit is generated which is the exclusive-or of the bits to be written. This parity bit essentially is determining whether an even or odd number of binary ones are in the string of bits. The parity bit is then appended to the data. On read back, the parity bit is checked to determine if the string of bits still has an even or odd number of binary ones. Obviously if there is a two bit error, this parity scheme will fail to detect it. Additionally, parity generation does not identify which bit is in error.

Parity generation is fast and inexpensive and is useful for identifying single bit errors. Other methods are available for detecting errors of more than one bit, and additionally, for correcting those errors. Cyclic redundancy code (CRC) and error correction code (ECC) are examples of methods well known in the art for checking and correcting errors in data. Using CRC reduces the number of defects that need to be tracked and replaced on a storage medium. Some defects are too large, i.e., affect too many bits for CRC to be able to correct the errors. In these instances, it is necessary to maintain a log identifying the defective sections of the storage medium and further, to provide a replacement section.

An optical disk is an example of a storage medium having a very high storage density, and hence, requiring efficient defect management. A spiral track is formed on the surface of the disk from the center to the outer edge. The spiral track forms many separately identifiable tracks, and each track is further divided into a plurality of sectors. Alternatively, the tracks can be formed on the surface of the disk as a plurality of concentric circles. A predetermined number of sectors are identified as a group, there being one to many groups on the disk. The optical disk may have many defective sectors due to particles, contaminants, or other surface defects. A number of spare sectors are set aside on the disk, for example, a portion of the spare sectors are located at the end of each group, as replacements for defective sectors. Many defective sectors can be found by performing a surface analysis of the disk. During surface analysis, known data is written to a sector and read back under stress conditions. Surface analysis, if performed, may be accomplished by the disk manufacturer, or may be completed during the formatting process.

Defective sectors found during surface analysis, referred to as primary defects, are taken out of service, and a logical block address (LBA) of the defective sector is reassigned to the next physical sector. Thus, there are unused sectors on the disk, and the remaining sectors slip, that is, spare sectors reserved at the end of the disk will be used. These defective sectors are further recorded on the disk in a primary defect list (PDL). Other defective sectors may be found during the life of the disk, referred to as secondary defects, and will have their logical block addresses reassigned to a sector that exists in an area of the disk reserved for replacing secondary defects. According to an American National Standards Institute (ANSI), spares may be placed in spare areas of the disk without having LBAs associated therewith. After reassigning the LBA, the data is moved to the spare sector. All defects found during the life of the disk are recorded on the disk in a secondary defect list (SDL).

A standard, ISO/IEC 10089:1991 (E) 130 mm Rewritable Optical Cartridge for Information Interchange, hereinafter referred to as the standard, has been established for 130 mm optical disk cartridges and is hereby incorporated by reference. The standard describes a method for recording defective sectors in the PDL and SDL. The standard also describes how to document the format of the media which is maintained in a disk definition structure (DDS). The DDS, for example, defines the number of groups (g), the number of sectors per group (m) set aside for data, and the number of spares per group (n). According to the standard, a user zone is made up of N+1 tracks (track 0 to N, wherein tracks 0, 1, 2, N−2, N−1 and N are reserved for use by the defect management areas (DMA). Therefore, N−5 tracks are available to a user. A maximum of 2048 sectors may be allocated as spares for the primary and secondary defect lists.

The user zone is divided into g groups, wherein g must be greater than or equal to one and less than or equal to 2048. The number of sectors per track (SPT) varies depending upon whether 1024 byte sectors or 512 byte sectors are defined. In the case of 1024 byte sectors, there will exist 17 SPT, and for 512 byte sectors, there will be 31 SPT. When initializing a disk for 1024-byte sectors, and each group, g, contains m sectors for data and n sectors as spares, equation [1] must be satisfied:

$$g*(m+n) \leq [17*(N-5)] - 2048. \qquad [1]$$

Similarly, when the disk is initialized using 512-byte sectors, equation [2] must be satisfied:

$$g*(m+n) \leq [31*(N-5)] - 2048. \qquad [2]$$

In a host computer system, the data sectors m are used for data storage and are viewed as a contiguous memory element of logical blocks, wherein each logical block is addressed by its LBA. Each data sector, then, is individually addressable and may be written to or read from individually.

The method to be used for replacing defective sectors with spare sectors is not set forth by the standard. The method for replacing defective sectors basically requires that the logical block address of the defective sector be reassigned by a spare sector. Because the order of information may be rearranged on the disk, it is also necessary to locate an LBA when consecutive LBAs are not recorded on physically consecutive sectors. The data stored in the PDL, SDL, and DDS on the disk provide the basic information necessary to manage defective sectors. Although this information is on the disk, it does not lend itself to providing quick defect management.

One method of determining replacement sectors on a disk includes building a defect map for tracking all known defects. Such a defect map is built each time a disk is inserted into a drive (or when a drive is initialized with a disk therein). Building a defect map requires copying the PDL, SDL, and DDS from the disk to a memory. The defect map also requires entries identifying the beginning of each continuous section on the disk, and information about each discontinuity. A binary search of the defect map is performed when establishing a track and sector number for a LBA.

Defect maps can be large, and the time required to generate a defect map can be prohibitive, especially as the density of data capable of being stored on a disk increases. The standard allows for up to 2048 defective sectors in the PDL and the SDL. Four bytes of memory are required to describe each sector. Hence the PDL may require up to 8 K bytes of memory. The SDL lists both defective sectors and replacement sectors, and hence may require as many as 16 K bytes of memory. Having a potentially large PDL and/or SDL means that substantial time is required to search these lists.

Thus what is needed is a method for more quickly locating spare sectors for replacing secondary defects that does not require large amounts of memory and substantial processing times for generating potentially large tables.

SUMMARY OF THE INVENTION

Accordingly, it is an object of the present invention to provide improved defect management on storage disks.

Another object of the present invention is to provide a method for more quickly locating spare sectors as replacements for secondary defects.

Yet another object of the present invention is to provide a method of locating spare sectors more quickly by searching a replacement sector list, and calculating the spare sector location therefrom.

These and other objects of this invention are accomplished by a method of assigning secondary storage regions for replacing defective primary storage regions on a storage medium having a plurality of primary and secondary storage regions formed thereon, each primary and secondary storage region having a unique location identification. The storage medium is logically divided into a plurality of groups, wherein each group includes a predetermined number of the primary and secondary storage regions. The storage medium further has a defective storage list stored thereon, the defective storage list being stored in a memory upon initializing the storage medium in a drive. The method comprises identifying a defective primary storage region and making an entry into the defective storage list for tracking the identified defective primary storage region. A group in which the identified defective primary storage region has been allocated is determined. The group determination can be made from the information stored in the defective storage list which identifies all other known defects and the location of the just identified defective region, and from the known structure of the disk, for example, the number of groups, and the number of primary and secondary storage regions per group.

Because the group containing the identified defective primary storage region is determined from the defective storage list and other known information, it is not necessary to compile large tables and search such tables. Having identified the group, an available secondary storage region allocated to the same group as the defective primary storage region is determined. The defective primary storage region is then replaced with the available secondary storage region. The secondary storage region, used as a replacement is next logged in a reassignment storage region list.

The foregoing and other objects, features and advantages of the invention will be apparent from the following more particular description of the preferred embodiment of the invention, as illustrated in the accompanying drawing.

DESCRIPTION OF THE PREFERRED EMBODIMENT

Figure 1:
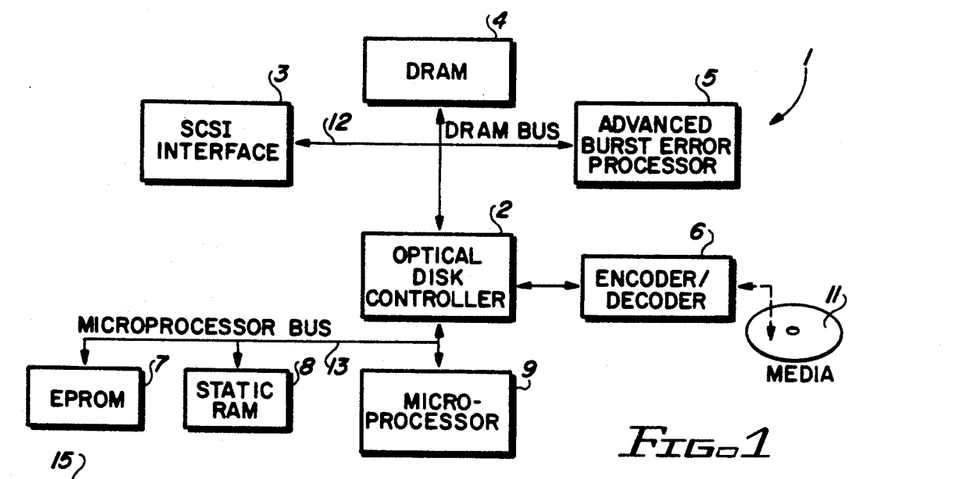
FIG. 1 is a block diagram of an apparatus for carrying out the present invention

FIG. 1 is a block diagram showing the component parts of an optical disk drive 1 that are relevant to the present invention. The optical disk drive 1 includes an optical disk controller (ODC) 2 which acts to send data to be written to a head (not shown) for storing the data on an optical disk 11, and further to receive data read from the optical disk 11. The ODC 2 is connected to a dynamic random access memory (DRAM) bus 12 for communicating with a small computer systems interface (SCSI) 3, a DRAM 4, and an advanced burst error processor (ABEP) 5. The SCSI 3 allows the optical disk drive 1 to communicate with other devices, for example, a host computer over a SCSI connection (not shown). The optical disk drive 1 could be one of a plurality of drives as would be found in an automated storage library.

The DRAM 4 temporarily holds data that is sent to or received from the SCSI 3, the ABEP 5, or the ODC 2. The DRAM 4 is able to be accessed such that data may be read therefrom and written thereto simultaneously. The ABEP 5 determines whether any errors exist in data read from the optical disk 11, and to the extent possible, corrects data errors. The ABEP 5 capabilities include generating parity bits, check sums, and cyclic redundancy codes (CRC) for blocks of data to be written to the optical disk 11, and on read back, verifies the parity, check sum, and CRC. An example of a CRC used by the ABEP is the Reed-Soloman code. The data written to or read from the optical disk 11 is further modified by an encoder/decoder 6 that is connected to the ODC 2. The data to be written to the optical media 11, after being coded by the ABEP 5, is sent to the encoder/decoder 6 from the ODC 2. The encoder/decoder 6 modulates the data, for example, into a (2,7) run length limited (RLL) code. Conversely, when reading data from the optical disk 11, the modulated data is restored by the encoder/decoder 6 before being received by the ODC 2.

An electronically programmable read only memory (EPROM) 7, a static random access memory (SRAM) 8, and a microprocessor 9 are connected to the ODC 2 by a processor bus 13. The EPROM 7 stores instructions to be made available to the microprocessor 9, for example, instructions for replacing a defective sector on the optical disk 11. The SRAM 8 stores work tables, for example a replacement list of defective sectors, and the PDL, SDL, and DDS from the optical disk 11. The microprocessor 9 steps through the instructions stored in the EPROM 7, controlling a mechanical drive device (not shown), instructing the ODC 2, the encoder/decoder 6 and the ABEP 5 to perform specific functions. Examples of the specific functions include, for example, write data to buffer from disk; write data to disk from buffer; transfer data from DRAM to SRAM (for reading the DDS, PDL and SDL); and transfer data from SRAM to DRAM (for updating the SDL or for formatting the medium and thus creating a DDS and PDL). The instructions for managing defects, as stored in the EPROM 7, and the tables, as stored in the SRAM 8, are covered in detail below.

Figure 2:
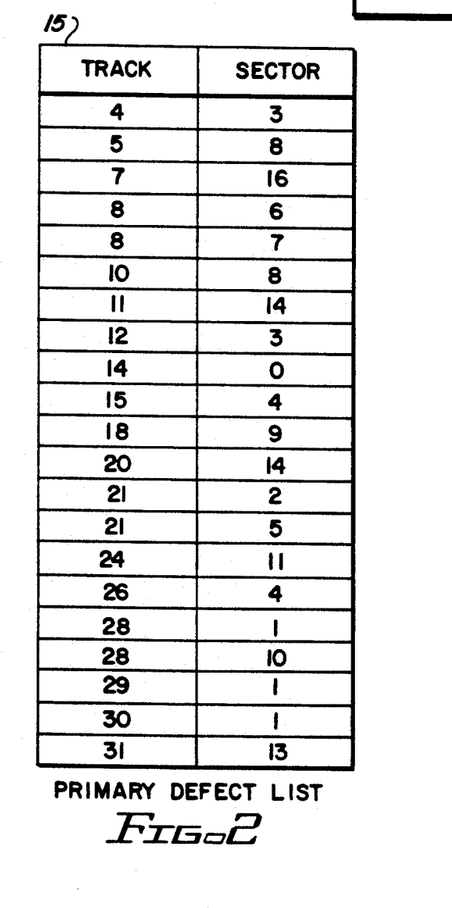
FIG. 2 is a primary defect list.

A primary defect list (PDL) 15, shown in FIG. 2, has the track and sector of each primary defect listed therein. The defective sectors listed in the PDL 15 are sectors that were determined to be defective during a surface analysis, for example, while formatting the optical disk 11. The surface analysis includes erasing the optical disk 11, writing data thereto, and reading the data back under stress conditions while looking for defective sectors. According to the ISO/IEC standard 10089:1991 (E), referred to hereinafter as the standard, up to 2048 defective sectors may be included in the PDL 15. Performing a surface analysis is not required, in which case the PDL 15 would be empty. However, since an optical disk inserted into the disk drive 1 may have had a surface analysis performed, the invention is described wherein there are entries in the PDL 15.

Figure 3:
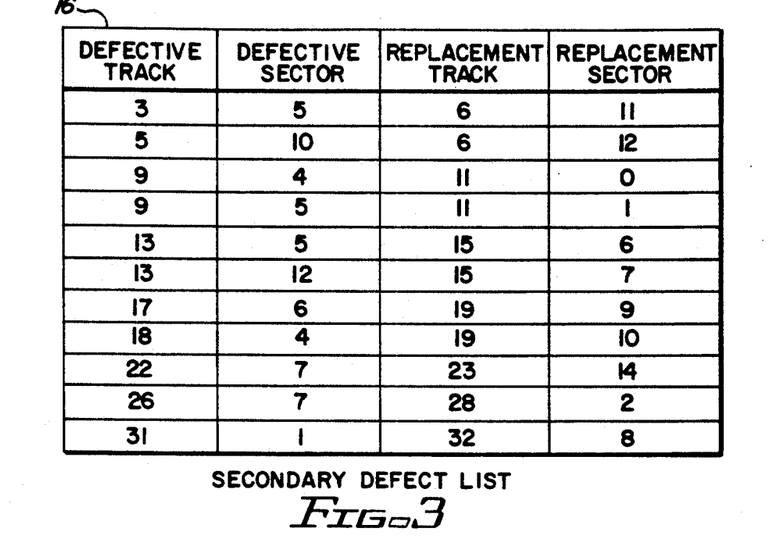
FIG. 3 is a secondary defect list.

FIG. 3 depicts a secondary defect list (SDL) 16 which identifies each secondary defective sector and its corresponding replacement sector. The secondary defects are found during use of the optical disk 11. Similar to the PDL 15, the standard provides for allocating sectors as replacements for secondary defects. Secondary defects are typically located when data is written to the optical disk 11 and read back for verification under stress conditions. If the ABEP 5 is unable to correct the errors, the sector responsible for the errors is flagged as being defective and its track and sector number is written to the SDL 16.

Figure 4:
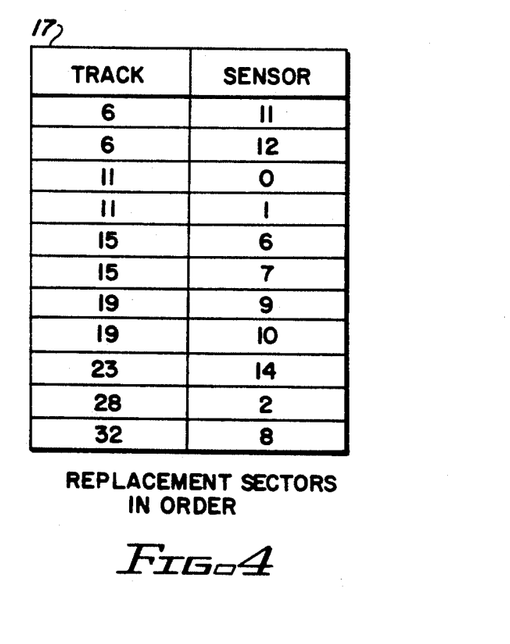
FIG. 4 is a sorted replacement sector list.

FIG. 4 shows only the replacement sector list 17 which is a portion of the SDL 16. In the present invention, each time a replacement sector is added, the replacement sector list is updated so that the replacement sectors will be listed in ascending order according to track and sector numbers.

Figure 5:
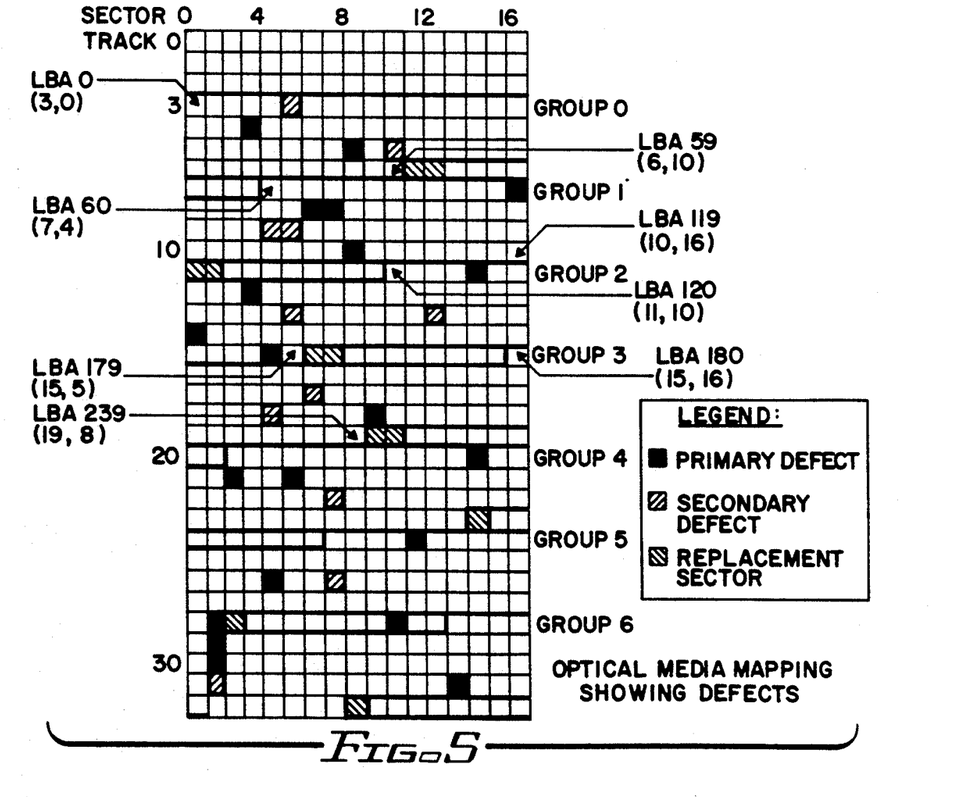
FIG. 5 is an optical media sector map.

FIG. 5 is an optical media map for illustrating the relationship of sectors to tracks and groups, and further providing an example of primary and secondary defects, as well as replacement sectors. According to the optical media map example, there exists seventeen sectors per track (zero to sixteen), SPT, sixty data sectors, m, and ten replacement sectors, n, per group, g. Each sector represents a storage region on the optical disk 11 capable of storing a predetermined number of bytes. Typically, a sector stores either 1024 or 512 bytes. In the preferred embodiment of the present invention, 1024 byte sectors are used, though 512 byte sectors could be used just as readily. The first three tracks, zero, one, and two, are reserved as disk management area (DMA) tracks in accordance with the standard. Group zero, therefore, starts at track three. Since there are sixty data sectors per group, group zero includes LBA's zero to fifty-nine, starting at track three, sector zero, and ending at track six, sector ten. A total of sixty-two data sectors are thus encompassed within group zero. The additional two sectors are the result of primary defects located during a surface analysis. Foregoing the surface analysis, on the other hand, results in exactly sixty data sectors being encompassed in each group. The two primary defects in group zero are not assigned LBAs, and hence cause slippage. Slippage is possible because 2048 sectors are reserved at the end of the data sectors. As each primary defect is found, all of the LBAs of the remaining data sectors are incremented such that a data sector of the reserved 2048 sectors becomes part of the data sectors.

Two secondary defects are also depicted in the optical media map. Unlike the primary defects, the secondary defects do not cause slippage, but are instead replaced by the first available spare sector in the group zero. In this example, the secondary defect located at at track three, sector 5, is replaced by the spare sector located at track six, sector 11. If all ten spare sectors in a group have been used, then spare sectors from an adjoining or nearby group may be used. The primary and secondary defects, and the replacement sectors as depicted in the optical media map are tabulated in the PDL 15, SDL 16, and replacement sectors list 17, of FIGS. 2, 3, and 4, respectively.

Defect management tables, which includes the PDL, SDL, and DDS are compiled and stored on the optical disk 11 according to the standard. When the optical disk 11 is inserted into the drive 1, or alternatively, if the drive 1 is powered on with the optical disk 11 installed, a initialization process will copy the defect management tables into the SRAM 8. Thereafter, each time a secondary defect is located, the SDL will be updated to reflect the addition. The SRAM 8 is likewise updated to reflect the additional secondary defect. Upon completing the reassignment process, a copy of the SDL 17 from the SRAM 8 is written back to the optical disk 11. On the other hand, the PDL 15 is written to the optical disk 11 only once during certification (or formatting). The replacement sector list 17, at initialization, is sorted and written to the SRAM 8. The replacement sector list 17 is a working list for providing information to the microprocessor 9 when spares are being located. The replacement sector list 17 may have a maximum size of 8 K bytes (2048 spare sectors * 4 bytes).

Figure 6A:
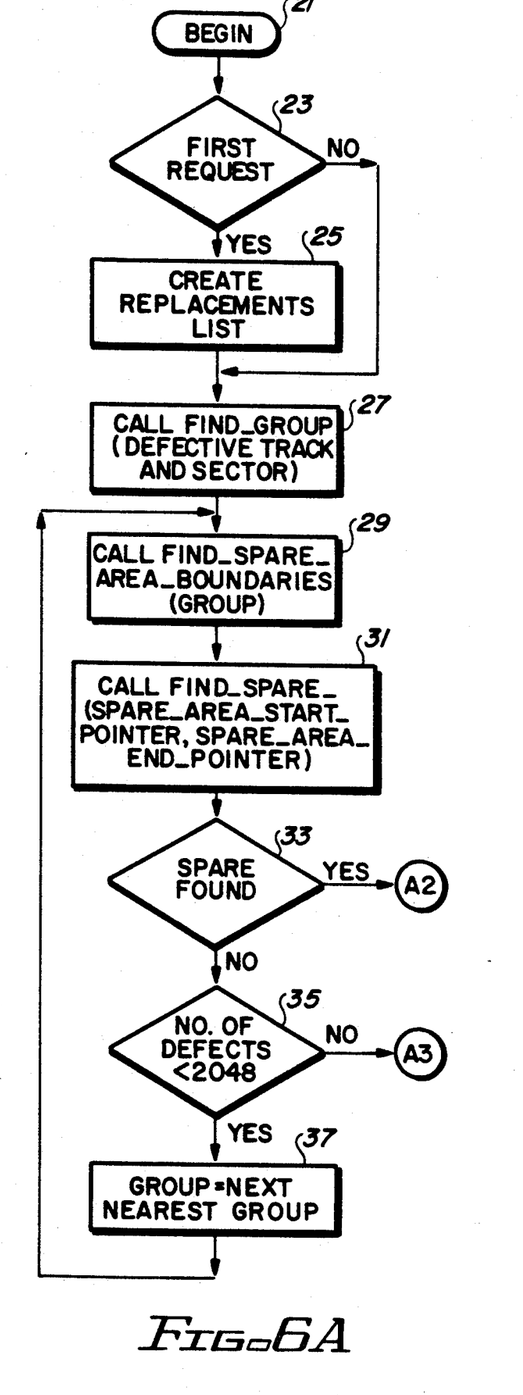
FIG. 6A–6C are flow diagrams of the preferred embodiment of the present invention.
Figure 6B:
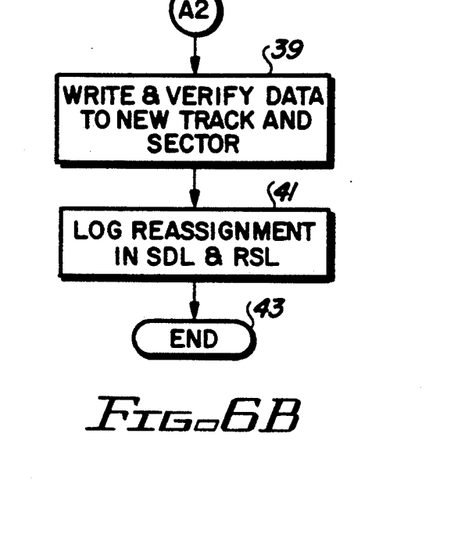
Figure 6C:
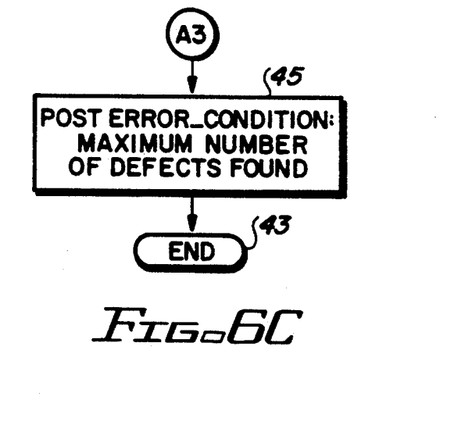

FIGS. 6A–6C are flow diagrams setting fourth the steps for carrying out the present invention. The instructions represented by the flow diagrams, may for example, be instructions stored in the EPROM 7. The process begins at step 21 wherein a secondary defect has been identified and a request has been made for a replacement sector. In this example, it is assumed that track 18, sector 12 has been identified as being a secondary defect, and the primary and secondary defects are as listed in the PDL 15 and the SDL 16 and shown in the optical media map. At step 23 a decision is made as to whether this is the first request for a replacement sector. If this is the first request, the replacement sector list 17 is created in step 25, otherwise step 25 is bypassed and an already existing replacement list 17 is accessed for determining which spare sectors have been previously assigned At step 27 the microprocessor 9 calls a find-group routine to calculate a group number, g, for identifying which group the secondary defect is located within.

Figure 7:
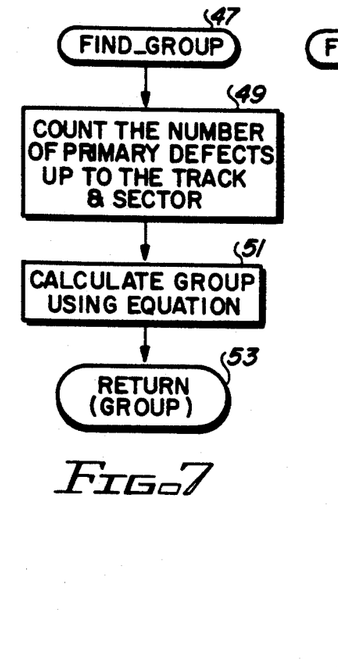
FIG. 7 is a flow diagram for determining a group.

The find-group routine is shown in FIG. 7 and includes steps 47, 49, 51, and 53. The find-group routine is initiated at step 47. At step 49, the number of primary defects listed in the PDL 15 up to the identified secondary defect are counted and this number is set equal to a primary defect count variable The group, g, is then calculated in step 51 according to the following equation:

$$\text{group} = \text{integer of } \{(\{(\text{defective track number} - \text{DMA tracks}) * \text{SPT}\} + \text{defective sector number} - \text{primary defect count})/(m+n)\}$$

The result g is returned at step 53 wherein the process continues at step 29. In equation [3], the primary defect count, as determined from the primary defect list 15, adjusts for slippage that occurs due to primary defects. If a surface analysis is not done, the primary defect count will equal zero. Solving equation 3 yields:

$$g = \text{integer of } \{(\{(18-3)*17\} + 12 - 11)/(60+10)\} = 3$$

Figure 8A:
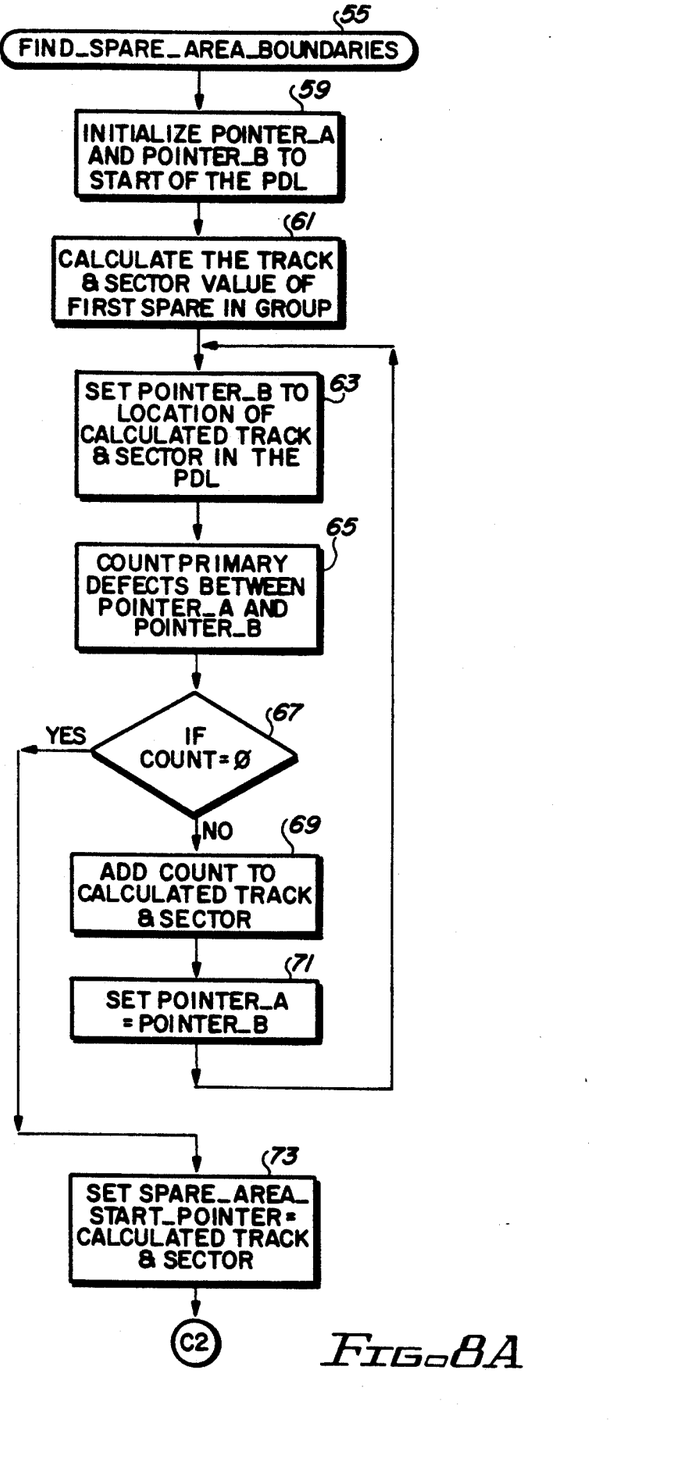
FIG. 8A and 8B are flow diagrams for determining spare boundaries.
Figure 8B:
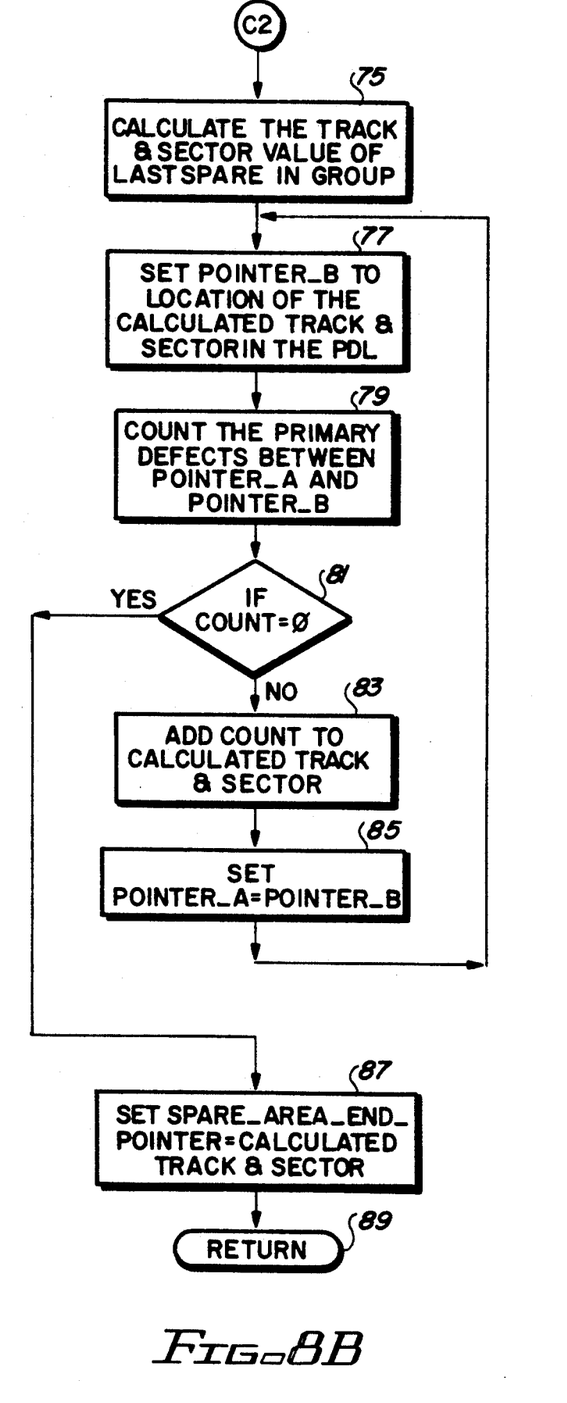

Each group has 10 spares allocated for replacing secondary defects. To find a spare, the boundaries of the 10 spare sectors is first determined. Step 29 calls a find-spare-area-boundaries routine to determine the spare boundaries in group three. FIGS. 8A and 8B show the steps for determining the spare boundaries. The find-spare-area-boundaries routine begins at step 55, and at step 59 pointers A and B are initialized to point to the start of the PDL 15. In step 61, a track and sector value of a first spare in the group is determined by equation [4]:

$$\text{calculated track} = \text{integer of } (\{\text{group} * (m+n)\} + (\text{DMA tracks} * \text{SPT}) + m)/\text{SPT}$$

Solving equation [4] yields:

$$\text{calculated track} = \text{integer of } (\{3 * (60+10)\} + (3 * 17) + 60)/17 = 18$$

The sector value is determined by equation [5]:

$$\text{calculated sector} = (\{(\{\text{group} * (m+n)\} + (\text{DMA tracks} * \text{SPT}) + m)/\text{SPT}\} = \text{calculated track}) * \text{SPT}$$

The calculated sector should be rounded up if necessary. Solving equation [5] yields:

$$\text{calculated sector} = (\{(\{3 * (60+10)\} + (3 * 17) + 60)/17\} - 18) * 17 = 15$$

Inspection of equation [5] reveals that the calculated sector is simply the remainder of the calculated track as determined in equation [4].

The pointer B is then set to equal the location of the calculated track and calculated sector in the PDL 15 in step 63. Once again it is necessary to account for slippage due to the primary defects. An iteration process may be required and is continued until no further adjustments are necessary due to primary defects. Iteration may be required because the calculated track and the calculated sector determine where the spare boundary would be if there were no primary defects. A number of primary defects up to calculated track and the calculated sector are counted and added thus compensating for slippage. However, there may be additional primary defects located between the calculated track and sector and the location determined by adding the counted primary defects to the calculated track and sector. The number of primary defects is easily determined by making a count of the entries in the PDL 15 located between the pointer A and the Pointer B as done in step 65. If the count equals zero, as tested for in step 67, then there is no slippage, and a spare-area-start-pointer is set equal to the calculated track and the calculated sector in step 73. If there is no slippage it is not necessary to iterate since the calculated track and the calculate sector will not be moved ahead by a count wherein additional primary defects could be located.

If step 67 determines that the count is not equal to zero, then in step 69 the count is added to the calculated track and the calculated sector. Step 71 sets pointer A equal to pointer B and steps 63, 65, 67, 69, and 71 are repeated until no primary defects are counted between pointers A and B, that is the spare-area-start-pointer is found by iteration The need for and results of the iteration can be seen by the example. The calculated track and sector equals track 18, sector 15. Referring to FIG.

2, pointer A is set at the start of the PDL 15 and the pointer B is set after the entry track 18, sector 9 (where the calculated track and the calculated sector would be) and the number of entries between pointers A and B are counted. There are eleven primary defects between pointers A and B, and count is set equal to 11. Referring to the optical media map in FIG. 5, the spare-area-start-pointer would move from track 18, sector 15 to track 19, sector 9 (moved eleven sectors). Step 69 shows that the count is added to the calculated track and calculated sector to achieve track 19 sector 9. Step 71 sets the pointer A equal to the pointer B, wherein the pointer B currently points to the entry directly after track 18 sector 9. Returning to step 63 causes the pointer B to move to track 19 sector 9. Step 65 counts the number of primary defects between the pointer A and the pointer B. However, there are no additional primary defects found in the PDL 15 between the pointers. The count is therefore set to zero and the loop is exited to step 73 based on decision step 67, and the spare-area-start-pointer set equal to track 19, sector 9 which is the correct start of the spare boundary for group three.

In FIG. 8B, step 75 calculates the track and sector of a last spare in the group. This is accomplished by adding the number of spares in a group minus one, (n−1), in this instance, nine. Once again it is necessary to make adjustments for any primary defects that may exist in the spare boundary area. Step 77 sets pointer B to the location of the calculated track and sector of the last spare in the PDL 15. The number of primary defects are counted between pointers A and B to determine the number of primary defects in the spare area. If no primary defects are found, the correct last spare has been correctly determined and control goes to step 87 and a spare-area-end-pointer is set accordingly. In the instant example, no primary defects existed in the spare area, hence the spare-area-end-pointer is set equal to the track and sector of the last spare in the group as determined in step 75, or track twenty, sector 1 (see FIG. 5).

If there were primary defects in the spare area, then count would not equal zero and an iteration will be required similar to the iteration performed for finding the spare-area-start-pointer. Step 83 adds the counted primary defects to the track and sector determined in step 75 and step 85 sets pointer A equal to pointer B. Steps 77, 79, 81, 83, and 85 are repeated until no more primary defects are counted. After the iteration is complete, step 87 is performed and the find-spare-area-boundaries routine returns to step 29. Control then flows to step 31 which calls a find-spare routine to determine whether a spare is available within the spare area boundaries. The find-spare routine is shown in detail in FIG. 9.

Figure 9:
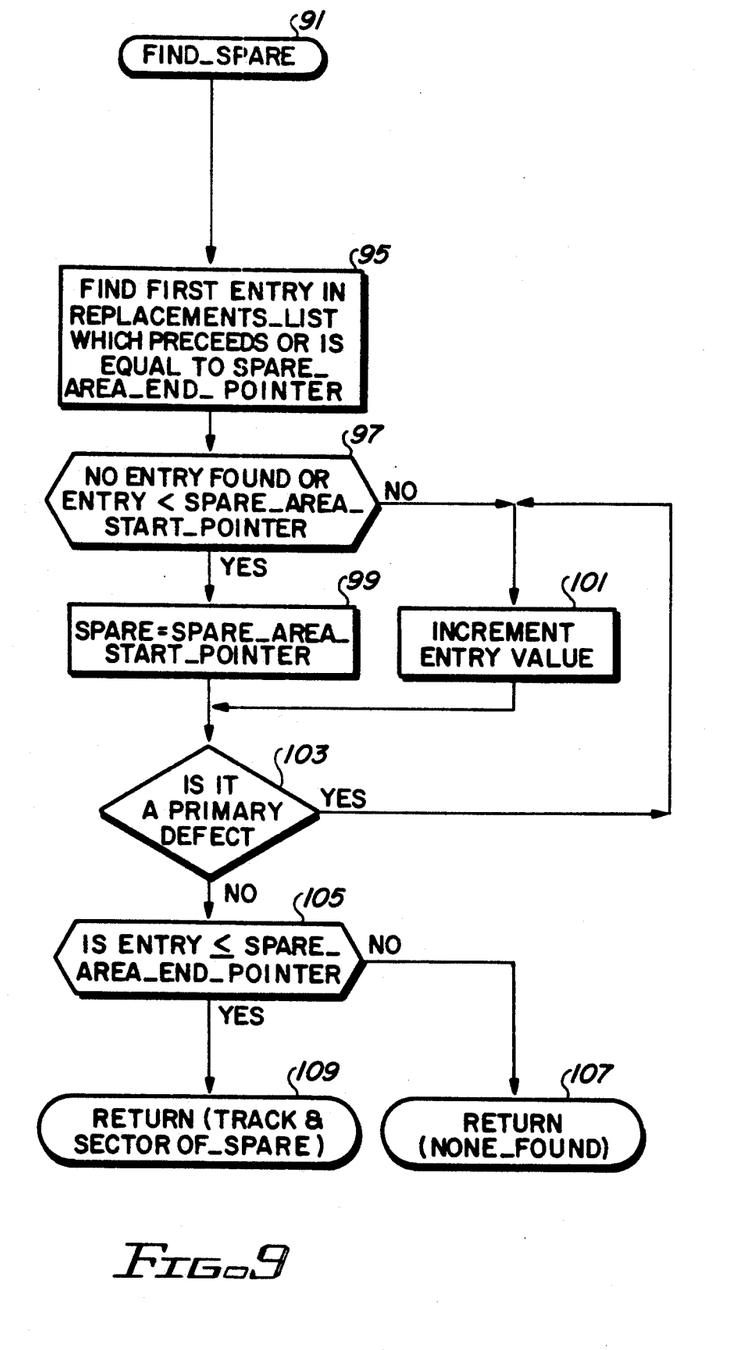
FIG. 9 is a flow diagram for determining a spare.

The find-spare routine is started at step 91. In step 95 the replacement sector list 17 is searched, for the highest track and sector entry less than or equal to the spare-area-end-pointer. This can be accomplished by using a binary search procedure with the spare-area-end-pointer as the list item to be searched. The binary search procedure can be designed to find a variable, wherein the variable is the largest list item less than or equal to the spare-area-end-pointer. A decision is made in step 97 to determine which spare is available to be used as a replacement sector. If no entry exists in the replacement sector list, or the entry points before the spare-area-start-pointer, the first spare within the spare area boundaries is identified as the replacement sector and is identified by a spare variable equal to the spare-area-start-pointer. If an entry is found, then it is already assigned as a replacement sector for a previously found secondary defect, and control is transferred to step 101 where that entry value is incremented such that the next higher spare is identified as a replacement sector. In the present example, track 19, sector 10 is identified as the spare.

After identifying the spare, several tests must be made to ensure that it is a valid spare. First, step 103 checks to see if the spare is not a primary defect by checking the PDL 15. If the spare is a primary defect, control goes back to step 101 to increment to the next spare. Steps 103 and 101 are repeated until a spare is found that is not also a primary defect. Since the spare may have been incremented due to primary defects, it is next necessary to test whether current entry is less than or equal to the spare-area-end-pointer. If the entry is still within the spare area boundaries, it is valid and control goes to step 109 which returns to step 33 with a track and sector number. If the entry is not valid, a suitable spare has not yet been found and control goes to step 107 where a none-found flag is set and returns to step 33.

Step 33 tests to see whether a valid spare was found. If a track and sector number were returned from step 109, then control goes to step 39 (FIG. 6B). The data that was to be written to the secondary defect is instead written to the spare sector in step 39. The reassignment of the spare sector for the secondary defect is logged in the SDL 16 and the replacement sectors list (RSL) 17 in step 41. The reassignment is then complete at step 43. On the other hand, a failure to locate a valid spare indicates that all of the allocated spares for that group have been used. Step 35 therefore checks to see whether the maximum number of defects of 2048 has been exceeded. If the maximum number of defects is exceeded with the last secondary defect then control is transferred to step 45 where an error message is provided to the host computer and the secondary defect cannot be replaced. If the maximum number of defects has not been exceeded, then a spare may be located in another group. Step 37 changes the group, g, to the next nearest group and steps 29, 31, 33, 35, and 37 are repeated until a valid spare is located. After locating a valid spare, steps 49 and 51 will be performed as just described.

While the invention has been particularly described with reference to particular embodiments thereof, it will be understood by those skilled in the art that various other changes in detail may be made therein without departing from the spirit, scope, and teaching of the invention. For example, the preferred embodiment of the invention has been described using an optical disk, but the invention is applicable to other types of media. Furthermore, the number of bytes per sector, the number of sectors per track, and other specific parameters may be varied without departing from the invention. Also the replacement list has been sorted in ascending order, but it will be appreciated that the replacement list may be sorted in other orders, for example, descending order.

Accordingly, the invention herein disclosed is to be limited only as specified in the following claims.

What is claimed is:

1. A method of assigning a secondary storage region for replacing a defective primary storage region on a storage medium having a plurality of primary and secondary storage regions formed thereon, each primary and secondary storage region having a unique track and sector location identification, the storage medium being logically divided into a plurality of groups, wherein each group includes a predetermined portion of the primary and secondary storage regions, the storage medium further having a defective storage list stored thereon, the defective storage list being stored in a memory upon initializing of the storage medium in a drive, the method comprising the steps of:

performing a surface analysis prior to using the storage medium wherein primary defects are identified ad a primary defect count provided therefrom;

identifying a defective primary storage region; determining a group to which the defective primary storage region has been allocated according to a group equation wherein:

group=integer of {({(defective track number−DMA tracks) * SPT}+defective sector number−primary defect count)/(m+n)}, where SPT is the number of sectors per track, m is the number of data sectors per group, n is the number of spare sectors per group, and DMA tracks are tracks reserved for use by defect management areas;

locating an available secondary storage region allocated to the same group as the defective primary storage region, wherein:

the track number of the available storage region=integer of ({group * (m+n)}+(DMA tracks * SPT)+m)/SPT, and the sector number of the available storage region=({({group * (m+n)}+(DMA tracks * SPT)+m)/SPT}−calculated track) * SPT;

replacing the defective primary storage region with the available secondary storage region, and updating the defective storage list to identify the defective storage region and logging the available secondary storage region in a reassignment storage region list.

2. The method according to claim 1 wherein the defective primary storage region is identified by writing data thereto and failing to correctly read the data therefrom.

3. The method according to claim 3 wherein the step of locating an available secondary storage region comprises:

determining a boundary of the portion of the secondary storage regions allocated to the group; and selecting the first unused secondary storage region within the boundary.

4. The method according to claim 1 wherein if there are no available secondary storage regions in the group another secondary storage region will be selected from a nearest adjacent group.

5. The method according to claim 1 wherein the storage medium is an optical disk having the primary and secondary storage regions arranged concentrically around the disk, the location identification of each primary and secondary storage region including a track and sector number, there being a predetermined number of sectors per track.

6. A method of locating a spare sector on a storage medium for replacing an identified secondary defect, the storage medium having a plurality of sectors formed thereon, wherein the sectors are logically divided into groups, each group having a predetermined number of sectors reserved as spares, wherein defect management tables have been compiled and stored on the storage medium, the defect management tables including a disk definition structure and primary and secondary defect lists, the defect management tables being copied to a memory upon initializing the storage medium in a drive, the method comprising the steps of:

calculating with a processor a group number for identifying which group contains the identified secondary defect;

determining a boundary for locating a plurality of spare sectors allocated to the identified group;

calculating with the processor a location of a spare sector within the plurality of spare sectors allocated to the group; and providing a physical address of the spare sector to the drive whereby access to the sector containing the identified secondary defect is instead directed to the spare sector.

7. The method according to claim 6 wherein a plurality of concentric circles are formed on the surface of the storage medium as tracks.

8. The method according to claim 6 further comprising the steps of:

creating a replacement sector list the first time a secondary defect is identified; and updating the replacement sector list to reflect the spare sector as replacing the identified secondary defect.

9. The method according to claim 6 further comprising the step of updating the secondary defect list to include the identified secondary defect.

10. The method according to claim 6 wherein the storage medium is an optical disk having a plurality of tracks, each track having a predetermined number of sectors per track, SPT.

11. The method according to claim 10 wherein the group containing the defective primary storage region is calculated by solving a group equation wherein:

group=integer of {({(defective track number −DMA tracks) * SPT}+defective sector number−primary defect count)/(m+n)}, where SPT is the number of sectors per track, m is the number of data sectors pre group, n is the number of spare sectors per group, and DMA tracks are tracks reserved for use by defect management areas.

12. The method according to claim 11 wherein calculating the location of the spare sector comprises the steps of:

calculating the track number of the spare sector=integer of ({group * (m+n)}+(DMA tracks * SPT)+m)/SPT;

calculating the sector number of the spare sector=({({group * (m+n)}+(DMA tracks * SPT)+m)/SPT}−calculated track) * SPT; and adjusting the calculated track and the calculated sector by a number of primary defects found therebefore.

13. The method according to claim 12 wherein a surface analysis has not been performed on the optical disk and the primary defect list is empty.

14. The method according to claim 13 wherein the step of updating the replacement sector list includes sorting the replacement sector list according to spare sectors in ascending order.

15. An apparatus for reassigning secondary storage regions for replacing defective primary storage regions, wherein the primary and secondary storage regions are formed on a storage medium, the storage medium being logically divided into a plurality of groups, wherein each group has allocated a predetermined portion of the primary and secondary storage regions, the storage medium further having a defective storage regions list stored thereon, the apparatus comprising:

controller means for sending data to be written and receiving data read from the storage medium;

processor coupled to the controller means for providing commands to the controller means;

a first memory coupled to the processor means for storing a copy of the defective storage regions list from the storage medium when the storage medium is first initialized in the apparatus; and a second memory coupled to the processor for storing instructions for the processor such that upon the apparatus discovering a defective primary storage region the processor causes an entry to be made into the defective primary storage regions list which identifies the defective primary storage region, the processor further calculating a group to which the defective primary storage region has been allocated, and further calculating a location of a secondary storage region allocated to the group for replacing the defective primary storage region.

16. The apparatus according to claim 15 further comprising a burst error processor coupled to the controller means for operating on the data written to and read from the storage medium, the burst error processor detecting when the data read from the storage medium is erroneous.

17. The apparatus according to claim 15 further comprising an encoder/decoder coupled to the controller means for encoding the data before being written to storage medium and decoding the data read from the storage medium.

18. The apparatus according to claim 15 wherein the storage medium is an optical disk.

19. The apparatus according to claim 18 wherein the first memory further stores a disk definition structure from the optical disk, the disk definition structure describing a number of tracks, a number of sectors per track (SPT), a number of sectors per group (m), a number of spares per group (n), and a number of DMA tracks.

20. The apparatus according to claim 19 wherein the first memory further stores a primary defect list for providing a primary defect count.

21. The apparatus according to claim 20 wherein the controller means provides a track number and a sector number for identifying the located defective primary storage region.

22. The apparatus according to claim 21 wherein the processor determines the group containing the identified secondary defect by solving the equation:

group=integer of {({(defective track number −DMA tracks) * SPT}+defective sector number−primary defect count)/(m+n)}, where SPT is the number of sectors per track, m is the number of data sectors per group, n is the number of spare sectors per group, and DMA tracks are tracks reserved for use by defect management areas.

23. A disk drive for locating a spare sector for replacing an identified secondary defect on a storage medium, the storage medium having a plurality of sectors formed thereon, wherein the sectors are logically divided into a plurality of groups, each group having a predetermined number of sectors allocated thereto, a portion of the predetermined number of sectors being reserved as spares, the storage medium having defect management tables stored thereon, the defect management tables including a disk data structure, a primary defect list and a secondary defect list, the disk drive comprising:

controller means for sending data to be written to and receiving data read from the storage medium;

processor means coupled to the controller means for providing commands to the controller means;

a first memory coupled to the processor means for storing a copy of the defect management tables from the storage medium when the storage medium is first initialized in the disk drive; and a second memory coupled to the processor means for storing instructions for the processor means such that upon the disk drive discovering the secondary defect the processor means causes an entry to be made into the secondary defects list which identifies the secondary defect, the processor means further calculating a group to which the secondary defect has been allocated, and further calculating a location of a spare sector allocated to the group for replacing the identified secondary defect.

24. The disk drive according to claim 23 further comprising a burst error processor coupled to the controller means for operating on the data written to and read from the storage medium, the burst error processor detecting when the data read from the storage medium is erroneous.

25. The disk drive according to claim 23 further comprising an encoder/decoder coupled to the controller means for encoding the data before being written to storage medium and decoding the data read from the storage medium.

26. The disk drive according to claim 23 wherein the storage medium is an optical disk.

27. The disk drive according to claim 26 wherein the first memory further stores a disk definition structure from the optical disk, the disk definition structure describing a number of tracks, a number of sectors per track (SPT), a number of sectors per group (m), a number of spares per group (n), and a number of DMA tracks.

28. The disk drive according to claim 27 wherein the first memory further stores a primary defect list for providing a primary defect count.

29. The disk drive according to claim 28 wherein the controller means provides a track number and a sector number for identifying the located defective secondary defect.

30. The disk drive according to claim 29 wherein the processor means calculates the group containing the identified secondary defect by solving the equation:

group=integer of {({(defective track number −DMA tracks) * SPT}+defective sector number−primary defect cont)/(m+n)}, where SPT is the number of sectors per track, m is the number of data sectors per group, n is the number of spare sectors per group, and DMA tracks are tracks reserved for use by defect management areas.

31. The disk drive according to claim 30 wherein the processor means calculates the location of the spare sector according to the following instructions stored in the first memory:

a calculated track number=integer of ({group * (m+n)}+(DMA tracks * SPT)+m)/SPT; and a calculated sector number=({({group * (m+n)}+(DMA tracks * SPT)+m)/SPT}−calculated track number) * SPT.

32. The disk drive according to claim 31 wherein the processor means adjusts the spare sector determination by adjusting the calculated track and the calculated sector by a number of primary defects found therebefore.

* * * * *

UNITED STATES PATENT AND TRADEMARK OFFICE
CERTIFICATE OF CORRECTION

PATENT NO. : 5,235,585
DATED : August 10, 1993
INVENTOR(S) : J. E. Bish, et al.

It is certified that error appears in the above-identified patent and that said Letters Patent is hereby corrected as shown below:

At column 11, line 11, the word "ad" should be --and--.

At column 11, line 42, the words "claim 3" should be --claim 1--.

Signed and Sealed this

Third Day of May, 1994

Attest:

BRUCE LEHMAN

Attesting Officer

Commissioner of Patents and Trademarks